(12) United States Patent
Fei et al.

(10) Patent No.: US 9,348,850 B1
(45) Date of Patent: May 24, 2016

(54) METHOD FOR LARGE-SCALE DATA SCHEMA ANALYSIS AND QUALITY ASSURANCE

(71) Applicants: Long Fei, Mountain View, CA (US); Ryan Michael Lefever, Mountain View, CA (US); Robbie Alan Haertel, Mountain View, CA (US)

(72) Inventors: Long Fei, Mountain View, CA (US); Ryan Michael Lefever, Mountain View, CA (US); Robbie Alan Haertel, Mountain View, CA (US)

(73) Assignee: Google Inc., Mountain View, CA (US)

( * ) Notice: Subject to any disclaimer, the term of this patent is extended or adjusted under 35 U.S.C. 154(b) by 336 days.

(21) Appl. No.: 13/794,312

(22) Filed: Mar. 11, 2013

(51) Int. Cl.
*G06F 17/30* (2006.01)

(52) U.S. Cl.
CPC .............................. *G06F 17/30292* (2013.01)

(58) Field of Classification Search
CPC ..................... G06F 17/30292; G06F 17/30297
USPC ........................................... 707/791, 802, 803
See application file for complete search history.

(56) References Cited

U.S. PATENT DOCUMENTS

| | | | |
|---|---|---|---|
| 7,134,072 B1 * | 11/2006 | Lovett et al. .................. 715/234 |
| 2008/0082560 A1 * | 4/2008 | Agrawal et al. ............... 707/101 |
| 2008/0294653 A1 * | 11/2008 | Golwalkar et al. ........... 707/100 |
| 2013/0179769 A1 * | 7/2013 | Gurfinkel et al. ............. 715/234 |
| 2014/0040217 A1 * | 2/2014 | Lemcke et al. ............... 707/700 |

* cited by examiner

*Primary Examiner* — Monica Pyo
(74) *Attorney, Agent, or Firm* — Honigman Miller Schwartz and Cohn LLP

(57) ABSTRACT

A system and method for large-scale data schema analysis and quality assurance is disclosed. A data schema may be received and compiled into an internal representation for analysis. The schema's information may also be exposed via an application programming interface. Using the schema's application programming interface along with a provided requirement, the schema may be analyzed and/or corrected for quality, consistency and interoperability.

5 Claims, 6 Drawing Sheets

{"description":"A representation of a person, company, organization, or place",
"type":"object",
"properties":{
"fn":{"description":"Formatted Name","type":"string"},
"familyName":{"type":"string", "required":true},
"givenName":{"type":"string", "required":true},
"socialSecurityNumber":{"type":"string", "required":false},
"email":{
"type":"object",
"properties":{
"type":{"type":"string"},
"value":{"type":"string","format":"email"}},
},
"tel":{
"type":"object",
"properties":{
"type":{"type":"string"},
"value":{"type":"string","format":"phone"}},
},
"adr":"http://json-schema.org/address"
}
}

FIG. 1a

{"description":"An Address following the convention of http://microformats.org/wiki/hcard",
"type":"object",
"properties":{
"post-office-box":{"type":"string","requires":"street-address"},
"extended-address":{"type":"string","requires":"street-address"},
"street-address":{"type":"string","requires":"region"},
"locality":{"type":"string","requires":"region","required":true},
"region":{"type":"string","requires":"country-name","required":true},
"postal-code":{"type":"string"},
"country-name":{"type":"string","required":true}
}
}

FIG. 1b

```
{"description":"A representation of a person, company, organization, or place",
"type":"object",
"properties":{
    "fn":{"description":"Formatted Name","type":"string"},
    "familyName":{"type":"string","required":true},
    "givenName":{"type":"string","required":true},
    "socialSecurityNumber":{"type":"string","required":false},
    "email":{
        "type":"object",
        "properties":{
            "type":{"type":"string"},
            "value":{"type":"string","format":"email"}},
    },
    "tel":{
        "type":"object",
        "properties":{
            "type":{"type":"string"},
            "value":{"type":"string","format":"phone"}},
    },
    "adr":"http://json-schema.org/address",
    "billing":"http://json-schema.org/billing"
    }
}
```

FIG. 2a

```
{"description":"A Billing Schema",
"type":"object",
"properties":{
    "credit-card-type":{"type":"string","required": true},
    "credit-card-number":{"type":"number","required":true},
    "expiration date":{"type":"date","required":true},
    "security code":{"type":"number","required":true},
    "adr":"http://json-schema.org/address"
    }
}
```

FIG. 2b

```
1: def check_that_optional_fields_dont_become_required(engine, reporter):
2:     for field_before, field_after in engine.changed_fields():
3:         if field_before.is_optional() and field_after.is_required():
4:             reporter.reportError('Field ' + field.before_name + ' changed from optional to required'.format(field_before.name))
```

FIG. 4a

```
1: def check_that_tag_does_not_change(engine, reporter):
2:     for field_before, field_after in engine.changed_fields():
3:         if field_before.tag != field_after.tag:
4:             reporter.reportError('Field ' + field_before.name + ' changed tags from ' + field_before.tag + ' to ' + field_after.tag.format(field_before.name, field_before.tag, field_after.tag))
```

FIG. 4b

METHOD FOR LARGE-SCALE DATA SCHEMA ANALYSIS AND QUALITY ASSURANCE

BACKGROUND

Software developers may use data schemas to exchange data between data systems or to store and organize data in storage systems. Data schemas, which are frameworks that help organize and interpret information, usually describe data objects and data object interrelationships. For example, a schema, such as the one illustrated in FIG. 1a, may represent a person and may consist of s such as: formatted name (fn), family name, given name, social security number, email, telephone number, and address. The address field may link to another schema, illustrated in FIG. 1b, that defines an address with fields such as: post office box, extended address, street address, address locality, address region, postal code, and address country.

In the last few years, Internet data has grown rapidly in amount and complexity. Additionally, data systems now have the ability to aggregate large amounts of data from many different sources. Data schemas therefore have become significantly larger and more intricate in order to handle the vast amounts of complex data from various places. Data schemas have also become more interdependent on one another since, for storage reasons, different parts of the same data are often divided among several different schemas and combined when the data needs to be manipulated or displayed. The scale, complexity, and dependencies of data schemas have become major challenges to managing data warehouses and large-scale data storage systems, especially since there may be problems with individual data schemas or consistency issues between data schemas that make it hard to provide users with meaningful information about data and correlations among different parts of the data.

Data schemas can have many different problems including problems with quality, consistency, and interoperability. Specifically, an individual schema may not conform to schema quality requirements for the dataset which the schema represents. These requirements may be articulated by a producer, consumer, developer, or dictated by technical capabilities of the storage system. For example, the storage system's consistency model may require sequential consistency or the storage system may not support transactions. Schemas should follow the requirements exactly for effective storage, integration, communication, and retrieval.

Correctness, compliance, and consistency issues arise during schema development. For example, there may be a requirement for a schema that represents a person as illustrated in FIG. 1a to contain a telephone number as an object that contains two fields: a type of telephone number as a string and a value for the telephone number also as a string. However, the schema may be implemented with the value of the telephone number as a number instead of a string. This wrong schema implementation could cause problems with data entry and integration as well as data retrieval. Another example of data schemas' correctness problems is that a schema may contain redundant information. For example, data schemas may contain duplicate fields or fields that can be derived from other fields. A schema may contain a field for age and a field for date of birth. Age is a field that may be derived from the date of birth field. The age field is therefore considered redundant information.

In addition to correctness problems, a schema may also not comply with policy guidelines. There may be, for example, a requirement that a data schema representing a person, such as the one of FIG. 2a, not include both a person's social security number and credit card number since these two pieces of identifying information, if stolen, may make it easy for an identity thief to commit identity fraud.

Although it may be easy to manually identify schemas that directly include incorrect fields, such as two first name fields for a person, or non-compliant fields, such as a co-located social security number and a credit card number in the example above, there may be certain instances in which schemas indirectly link to other schemas. This indirect linkage can cause a schema to have incorrect fields or be non-compliant. For example, there may be a policy, as discussed above, in which a schema representing a person cannot contain, either directly or indirectly, a social security number and a credit card number. A person data schema, such as the one illustrated in FIG. 2a, would violate that policy because the schema contains a social security number and linking to a billing schema, illustrated in FIG. 2b, that contains a credit card number. While the person schema does not directly contain both a social security number and a credit card number, indirectly a person is linked to a credit card number via the billing schema. This type of indirect non-compliance is hard to detect manually especially in large-scale systems where the data schemas are highly complex and interdependent.

Data schemas are also not always consistent, making data communication and transfer among systems and data integration difficult. Software developers and/or data analysts usually expect data in a certain format from a data source in order to write code that uses the data. If the data is not received in the anticipated format, there may be problems with the software developer's code not being compatible with the data format. Additionally, software developers may find certain schema structures difficult to understand or to use to perform statistical analysis on data.

Techniques have been developed to address some schema issues, namely data quality and schema quality. Most schema formats allow for specifying constraints on data in an effort to control data quality. These constraints can be specified on columns of tables in relational databases. For example, using the person schema example from above, there may be a person table. Each field from the person schema may be represented in a column of the person table. The columns for last name and first name may have constraints on them requiring them not to be empty when a new person is added. Each person inserted into the table may also be required to have a unique key to differentiate one person from another. Additionally, the address column may be a foreign key reference to another table, an address table, that holds all address information. The address column in the person table may have a foreign key constraint to reference a valid primary key of the address table. A column may have a constraint that it is unique for every row inserted into the table or may have a check constraint which is a conditional expression that further limits the domain of the column. However, these column constraints do not address the quality of data schemas themselves.

There are a few customary automated and manual techniques for improving schema quality. One automated technique is to validate a schema based on declarative predicates, which are assertions of certain properties of the schema, during database view updates. This technique only works on deductive databases where schemas are a set of deduction rules and constraints. Furthermore, this technique is limited to schema field checking.

A second automated technique allows validation of a few pre-defined schema properties. Using this technique, schema validation is performed by an assertion-based set of tests which only allows checking a fixed set of properties on data schemas.

Manual techniques for improving schema quality usually involve data engineers or users to review proposed data schemas and their relations. This process can be laborious, error-prone, and costly. The process can also be inconsistent because it requires aggregating human opinions. It is also infeasible to scale manual processes to handle large and fast-growing or frequently changing schemas.

SUMMARY

Although there are customary approaches and techniques for improving data and schema quality, no known programmatic methods are applicable to all schema representations or allow for general-purpose schema analysis and quality and consistency assurance. Therefore, there should be a general, automated way to evaluate properties of data schemas and improve schema quality and consistency so that data can be more easily managed, analyzed, transferred, and stored. A general approach should work with all known schema representations. This specification describes technologies relating to analyzing data schemas and improving schema quality in general, and specifically to a method that exposes individual elements of a schema via an application programming interface (API) and uses the API for schema analysis and quality management.

In general, one aspect of the subject matter described in this specification can be embodied in systems and methods for large-scale data schema analysis and quality assurance. An exemplary system includes: one or more processing devices and one or more storage devices storing instructions that, when executed by the one or more processing devices, cause the one or more processing devices to receive a data schema; expose one or more of the schema's information via an application programming interface; provide analysis application programming interfaces for schema analysis; and use the schema's application programming interface along with the provided analysis application programming interfaces to analyze the schema. A second exemplary system includes a data schema compiler that compiles data schema files for analysis; an analyzer/checker that analyzes the compiled data schema files to identify problems or concerns with the schema; a reporting component that renders information from the analyzer/checker using a user interface; and an analysis engine that controls the execution flow of the system and provides schema analysis application programming interfaces to facilitate analysis. An exemplary method includes receiving a data schema; exposing one or more of the schema's information via an application programming interface; providing analysis application programming interfaces for schema analysis; and using the schema's application programming interfaces to analyze the schema.

These and other embodiments can optionally include one or more of the following features: an exemplary system or method may receive and use a provided requirement to analyze the schema; a requirement may be a user-written script; a requirement may be a user-written specification in a custom language; a requirement may come from a specification that is compiled into a binary executable; machine learning can be used to identify problems within schemas; schemas may be written in response to schema analysis results; and information related to analyzing the schema may be logged.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1a is a block diagram illustrating an exemplary person schema.

FIG. 1b is a block diagram illustrating an exemplary address schema.

FIG. 2a is a block diagram illustrating an exemplary person schema.

FIG. 2b is a block diagram illustrating an exemplary billing schema.

FIG. 4a is a block diagram illustrating an exemplary script.

FIG. 4b is a block diagram illustrating an exemplary script.

DETAILED DESCRIPTION

According to an exemplary embodiment, analyzing schema data, improving schema quality, and ensuring schema consistency can be done by (1) exposing schema fields and other schema information via an application programming interface (API), (2) providing APIs that help analyze schemas, and (3) analyzing schemas via a schema analysis and quality assurance tool using schema APIs and provided APIs. Additionally, user requirements can be received and used to analyze schemas.

Figure 3:
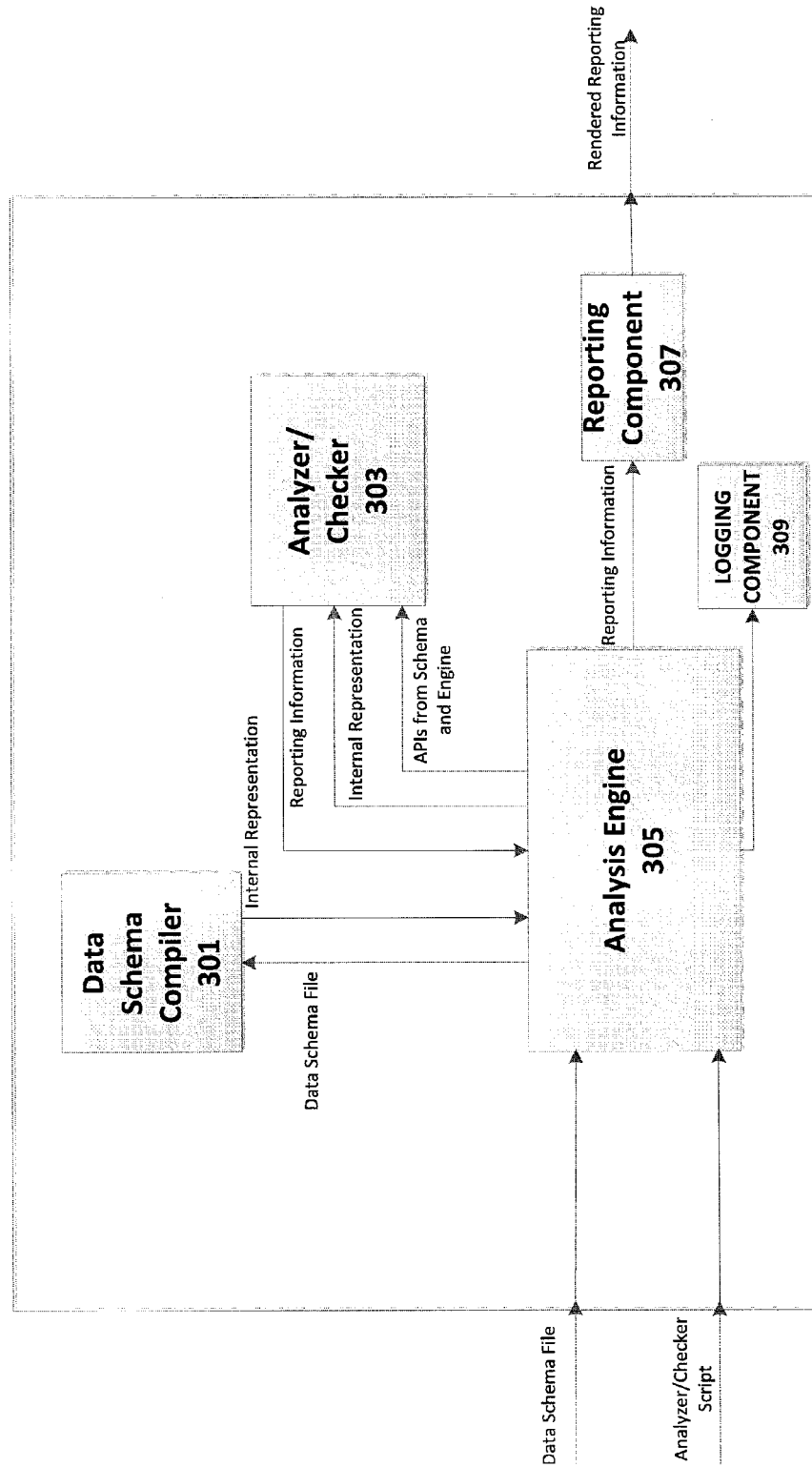
FIG. 3 is a block diagram illustrating an exemplary system for large-scale data schema analysis and quality assurance.
Figure 6:
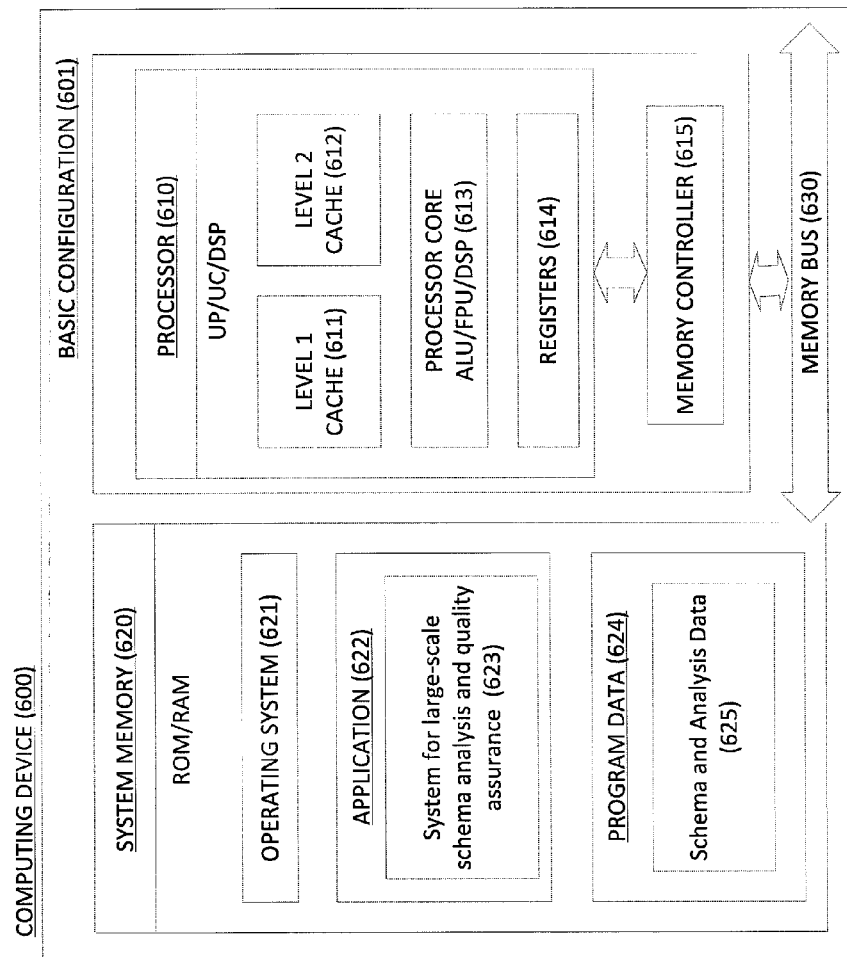
FIG. 6 is a block diagram illustrating an exemplary computing device.

An exemplary tool, as shown in FIG. 3, includes a data schema compiler (301) that compiles data schema files into an internal representation for analysis; an analyzer/checker (303) for analyzing data; an analysis engine (305) that drives the tool's execution flow; and a reporting component (307) that provides analysis information to a user. The tool may optionally include a logging component (309) for logging information regarding schema processing or errors. An exemplary tool can execute on an exemplary computer (600) as shown in FIG. 6 and discussed below.

The internal representation created by the data schema compiler (301) may at least represent the fields of the data schema necessary for checking the schema. An application programming interface (API) may expose these schema fields and other schema information.

Additional APIs may be provided by the analysis engine (305) to help analyze schemas. These APIs may include the ability to traverse a schema and/or locate changes within the schema. APIs may also allow for traversing a schema graph which can include a current schema, the schema's inherited schemas, and the schemas that inherit from the current schema.

An exemplary tool may also include an analyzer/checker (303) that analyzes the internal representation of the data schemas to identify problems or concerns about the schemas or to provide analysis about the schema.

According to an exemplary embodiment, an analyzer/checker (303) may be used to analyze a data schema. In an example use case of the exemplary embodiment, the analyzer/checker (303) can identify problems with schema formatting. Schemas may have a standard format in which they should be written. This standard format may include appropriate indentation, spacing, and limits on the length of a line. The tool may be used to rewrite a schema in standard format if the schema is not in the standard format. In addition to formatting violations, schema rewriting may be done by the tool to fix other violations. For example, there may be a rule that states that two fields cannot have the same tag number. The tool may reassign tag numbers for fields that have violated this tag rule.

In other embodiments, the analyzer/checker (303) may specifically be used for checking, which is a special case analysis that compares analytic findings against a set of known requirements. An analyzer/checker (303) may need the schema requirements in order to perform checking. User requirements may be specified in various ways including: (1) as a scripting language that is interpreted using a standard interpreter for the language; (2) in a custom language that is interpreted directly by the analysis engine; and (3) in a programming language that can be compiled to an executable binary. These methods for specifying user requirements are discussed in more detail below.

One way to provide user requirements is for a user to write a script using a high-level programming language and a schema's API. For example, a script may be written to test features of a protocol buffer, which is a format to describe structured data. As illustrated in FIG. 4a, a script may be written to check whether fields within a protocol buffer are optional.

Protocol buffer messages can have both optional and required fields. However, in order to maintain backward compatibility, there may be a rule that once a field has been declared optional in a schema version, it should never become required in a later schema version. Therefore, a software developer may want to test the optionality of fields in a protocol buffer's schema in order to determine if the schema violates this rule.

As shown in FIG. 4a, the analysis engine may be queried for a list of the fields (line 2) that have changed between schema versions. If the field in the previous version was optional, but the field is now required (line 3), the script instructs the reporter to report an error regarding the fact that the field changed from optional to required (line 4).

A protocol buffer also has a unique tag assigned for each field in the buffer. Another rule for protocol buffers may be that each field's tag should be unique and should not change between versions. A user-defined script could be written to ensure that a field's tag number never changes. An example script may be illustrated by FIG. 4b. The analysis engine is queried for all the fields that have changed from one schema version to the next (line 2). Then, if a field's previous tag does not equal the field's current tag (line 3), the reporter reports an error regarding the tag for that field (line 4). Using this user-defined script approach, the analyzer/checker (303) does not have to interpret schema requirements, but can perform analysis directly using the scripts.

A second way to deliver user requirements to the analyzer/checker (303) is for a user to provide a requirement specification, written in a custom high-level specification language, to the tool's analysis engine (305). For example, a custom language may be written that allows specifications to be identified in predicate syntax. A high-level specification may be "not exists (field) such that field.current.tag_id !=field.after.tag_id." Like the script shown in FIG. 4b, this specification requires that a field have the same tag number in a new version of a schema as the field's tag number in a previous schema version. The analysis engine (305) may need to interpret the requirements described in the specification. In this case, the tool exports a language in which requirements can be written. The analyzer/checker (303) may then perform checks based on those interpreted requirements. The tool then needs a way to understand and interpret the exported language.

A third approach to provide user requirements is for the tool's analysis engine (305) to obtain requirements from a specification provided by a user and written in a programming language that can be compiled to an executable binary. The tool may export an API with which requirements may be written. An executable binary may be produced via the following steps: (1) the user may write code using a specific programming language that implements a requirement specification and (2) a compiler for the specific programming language may be used to produce the executable binary from the user's code. Although the compiled specification may be an executable binary, the specification may alternatively be provided as a service which can be queried to perform certain actions.

The analysis engine (305) may compile the specification into executable binary and then allow the analyzer/checker (303) to perform checks. This approach differs from merely providing the specification to the tool in that the tool does not need to understand or interpret the specification in this approach. The specification only needs to be compiled into executable binary.

The analysis engine (305) drives the execution flow, including, but not limited to, workflow, scheduling, and parallelism. The analysis engine needs to drive a flow that includes, but is not limited to: (1) compiling schemas to be analyzed; (2) populating information needed by APIs; (3) running all user-written checks and analyses; and (4) collecting results from the checks and analyses. The engine (305) manages the data produced and used by each component. The engine (305) also implements and exports the application programming interfaces needed for analysis. These APIs are tailored to the types of schemas that are to be analyzed or checked and should be designed so that they make it easy to access schema fields and other schema information in the analyzer/checker component.

In some embodiments, the analysis engine (305) may combine any of the above-mentioned approaches for specifying user requirements in order to analyze schemas. The analysis engine may also optionally log information related to analyzing schemas using a log component (309).

In addition to manually specified requirements, aspects of the inventive concepts allow for automatic analysis using statistical and machine learning models. Machine learning may be used to automatically infer requirements from data without the user having to manually specify any requirements. For example, models can be built to predict the appropriate conditions under which a schema may store certain types of data. In order to build models, software developers may use factors to predict appropriate data conditions such as the nature the data; data sensitivity; and the accessibility of the data source. The analysis engine (305) can apply the machine learning model to identify problems within schemas. Techniques based on anomaly detection may also be used to identify potential problems in schemas.

The analyzer/checker (303) may review a particular data schema multiple times in order to thoroughly analyze the schema. The analyzer/checker (303) then emits relevant information and provides the information to a reporting component (307). The results from the analysis stage can include, but is not limited to, information about a schema's requirement violations, the schema's inconsistencies, or general statistics about the schema or data.

The reporting component (307) takes the information from the analyzer/checker (303) and renders the resulting analysis information via a mechanism for transmitting data to other machines or users such as an API or a user interface. This component can present the results in text-based, web-based, graphical user interface, or alternative user interfaces. The reporting component may filter, prioritize, group, transform, or aggregate results so that users can quickly locate results related to the most pressing issues. The rendered report information may also include suggestions to fix issues identified by the analysis. For example, a report may suggest that a software developer change the primary key of a schema from one field to another. Another suggestion may be to remove the nullable specification on a specific field so that the field can no longer be null, or empty.

A report may also be able to provide statistical analysis of a schema. The tool may be able to identify a field and provide a user feedback regarding schemas with similar fields. For example, a person schema may contain a field for a person's last name, naming the field "surname." A report may contain the following message: "for fields like field 'surname,' most people use names like 'last_name'."

Figure 5:
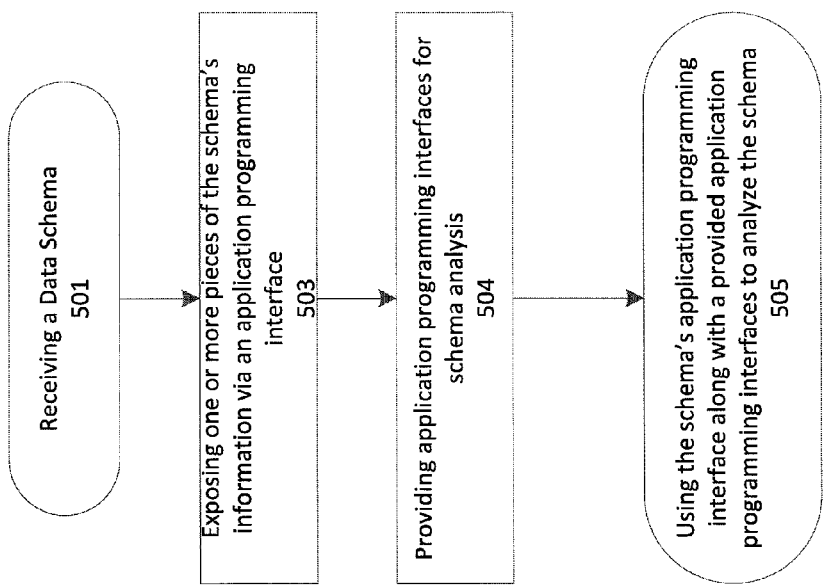
FIG. 5 is a flow diagram of an exemplary method for large-scale data schema analysis and quality assurance.

An exemplary method begins by receiving a data schema as illustrated in FIG. 5 (501). The schema is compiled into an internal representation of data for analysis. The data schema's information may be exposed through an application programming interface (API) (503). Additional application programming interfaces may be provided for schema analysis (504). These APIs may include an API to traverse a schema and/or an API to locate changes within a schema. The schema's API may be used along with the provided APIs to analyze and test the data schema (505). Additionally, schema requirements may be provided for further schema analysis. Schema requirements may be provided in ways discussed above including through user-written scripts, user-written specifications, or compiled executable binary. Results of the analysis and testing may then be provided to an end user.

In some embodiments, an exemplary embodiment may be implemented as a library or as a component of another product or service and not as a complete, standalone tool. Specific functionality of the exemplary tool may be used by another product or service to analyze schemas. Instead of the complete execution flow discussed above, a product or service may alternatively use the library or component to analyze part of a schema.

FIG. 6 is a high-level block diagram of an exemplary computer (600) that is arranged for large-scale data schema analysis and quality assurance. In a very basic configuration (601), the computing device (600) typically includes one or more processors (610) and system memory (620). A memory bus (630) can be used for communicating between the processor (610) and the system memory (620).

Depending on the desired configuration, the processor (610) can be of any type including but not limited to a microprocessor (µP), a microcontroller (µC), a digital signal processor (DSP), or any combination thereof. The processor (610) can include one more levels of caching, such as a level one cache (611) and a level two cache (612), a processor core (613), and registers (614). The processor core (613) can include an arithmetic logic unit (ALU), a floating point unit (FPU), a digital signal processing core (DSP Core), or any combination thereof. A memory controller (616) can also be used with the processor (610), or in some implementations the memory controller (615) can be an internal part of the processor (610).

Depending on the desired configuration, the system memory (620) can be of any type including but not limited to volatile memory (such as RAM), non-volatile memory (such as ROM, flash memory, etc.) or any combination thereof. System memory (620) typically includes an operating system (621), one or more applications (622), and program data (624). The application (622) may include a method by which fields and other information of data schemas can be programmatically evaluated. Program Data (624) includes storing instructions that, when executed by the one or more processing devices, implement a method for analyzing data schemas (623). In some embodiments, the application (622) can be arranged to operate with program data (624) on an operating system (621).

The application (622) may also include the components for the analysis tool illustrated in FIG. 3 including: a data schema compiler, an analyzer/checker, a reporting component, and an analysis engine.

The computing device (600) can have additional features or functionality, and additional interfaces to facilitate communications between the basic configuration (601) and any required devices and interfaces.

System memory (620) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of the device (600).

The computing device (600) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (600) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for large-scale data schema analysis and quality assurance comprising:
    receiving a data schema;
    exposing schema information including schema fields of the received data schema via an application programming interface;
    receiving a user-defined requirement specifying an analysis to perform on the received data schema, wherein receiving the user-defined requirement comprises:
        receiving a user-written code indicating a requirement specification; and
        compiling the requirement specification from the user-written code into an executable binary;
    providing at least one additional analysis application programming interface required to perform the schema analysis specified by the user-defined requirement; and
    using the schema's application programming interface along with the provided at least one additional analysis application programming interface to analyze the data schema, wherein the additional analysis application programming interface provides methods that analyze the data schema by traversing the exposed schema fields or locating changes within the exposed schema fields.

2. The method of claim 1 further comprising logging information related to analyzing the schema.

3. A system for large-scale data schema analysis and quality assurance comprising:
    one or more processing devices and
    one or more storage devices storing instructions that, when executed by the one or more processing devices, cause the one or more processing devices to:
        receive a data schema;
        expose schema information including schema fields of the received data schema via an application programming interface;
        receive a user-defined requirement specifying an analysis to perform on the received data schema, wherein the one or more processing devices receive the user-defined requirement by:
            receiving a user-written code indicating a requirement specification; and
            compiling the requirement specification from the user-written code into an executable binary;
        provide at least one additional analysis application programming interface interfaces for required to perform the schema analysis specified by the user-defined requirement; and
        use the schema's application programming interface along with the provided additional analysis application programming interface interfaces to analyze the data schema,
    wherein the additional analysis application programming interface provides methods that analyze the data schema by traversing the exposed schema fields or locating changes within the exposed schema fields.

4. The system of claim 3 further comprising logging information related to analyzing the schema.

5. The system of claim 3 further comprising rewriting the schema in response to the results of the schema analysis.

* * * * *